June 30, 1959  W. E. GRAY, JR  2,892,334
COMBINATION WASHER AND DRYER
Filed June 2, 1955  4 Sheets-Sheet 1

INVENTOR.
WALTER E. GRAY, JR
BY
HIS ATTORNEY

INVENTOR.
WALTER E. GRAY, JR.
BY
HIS ATTORNEY

June 30, 1959

W. E. GRAY, JR 2,892,334

COMBINATION WASHER AND DRYER

Filed June 2, 1955

INVENTOR.
WALTER E. GRAY, JR.

BY

HIS ATTORNEY

United States Patent Office 2,892,334
Patented June 30, 1959

2,892,334

COMBINATION WASHER AND DRYER

Walter E. Gray, Jr., Erie, Pa., assignor to General Electric Company, a corporation of New York Application June 2, 1955, Serial No. 512,612

22 Claims. (Cl. 68—12)

This application relates to laundry apparatus, and more particularly to a laundry appliance and control system therefor for washing and drying clothes.

An object of this invention is to provide in connection with a combination washer-dryer, an improved electrical control system by which the sequence of operations is automatically selected with predetermined periods for washing, rinsing and extracting; in which operations such as liquid fill and final dry, requiring variable time periods are controlled independently of time, but in proper sequence; by which greater safety and improved performance is achieved through interlocked controls for liquid fill and drain, heater operation, sequence control drive, and operation of the main drive motor and transmission; by which a clothes drying operation is performed with maximum heat, limited, however, to a safe operating temperature; and by which the various functions are carried out automatically in a simplified manner featuring reliability, adjustability, and simplicity.

In accordance with one aspect of my invention, a water level sensing device is employed to operate circuit control elements by which liquid fill operations are controlled, through which a sequence control timer is made effective for those operations which are timed, and through which heating means for the machine and for clothes drying operations are controlled.

A further aspect of this invention contemplates performance of a drying operation with a multiple-section heater controlled by thermally sensitive means for de-energizing the heater sections at different temperature levels; with additional control means to avoid risks of over-heating by requiring operation of the main drive motor and transmission to the clothes containing basket, and with provision for a condenser water supply. While the sequence control normally remains inactive during machine operation as a dryer, positive protection is provided both by the main thermally sensitive means and by a safety thermal device, either of which commences sequence control operation when closed, thereby to advance the sequence control to a positive "off" position.

Also, by this invention increased safety and reliability is provided by employing circuits so that operation of various components such as heaters and valves is dependent upon operation of the main drive for the machine. The main drive in turn may be made effective only when the access door for the machine is closed. The invention further features a control system for the drying operation for a machine of the type providing moisture condensation within the machine, with an interlocking control set so that the drain means for the machine is effective at all times when condenser water is being supplied.

This invention will be better understood from the following description taken in connection with the accompanying drawings, and its scope will be pointed out in the appended claims.

Figure 1:
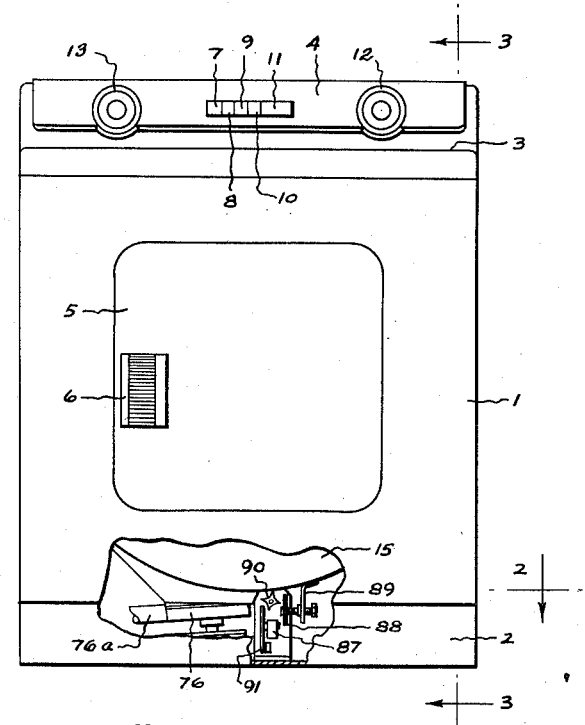
Fig. 1 is a front elevation of a combination washer-dryer, with a portion thereof broken away to illustrate interior details.

Referring now to the drawings, in Fig. 1 is illustrated laundry apparatus in the form of a domestic combination washer and dryer. The operating components of the machine are included within an outer cabinet structure comprising a wrap-around central section 1 supported on a base and toeboard assembly 2 and carrying a separate top 3 with integral backsplash panel 4. An access door 5 mounted on concealed hinges is arranged for convenient operation by a knee-operated latch control member 6. The backsplash panel provides a convenient place for operator controls, such as for example a plurality of push buttons including an "off" button 7, hot and warm water buttons 8 and 9, a dryer control push button 10, and a water heater button 11. A rotatable control knob 12 is provided for convenient operator selection of any step in the sequence of operations; while a left-hand control knob 13 may be included for operator selection of operating temperatures for the drying portion of the complete cycle. As will be seen hereinafter, these controls permit complete flexibility of operation of the machine.

Figure 3:
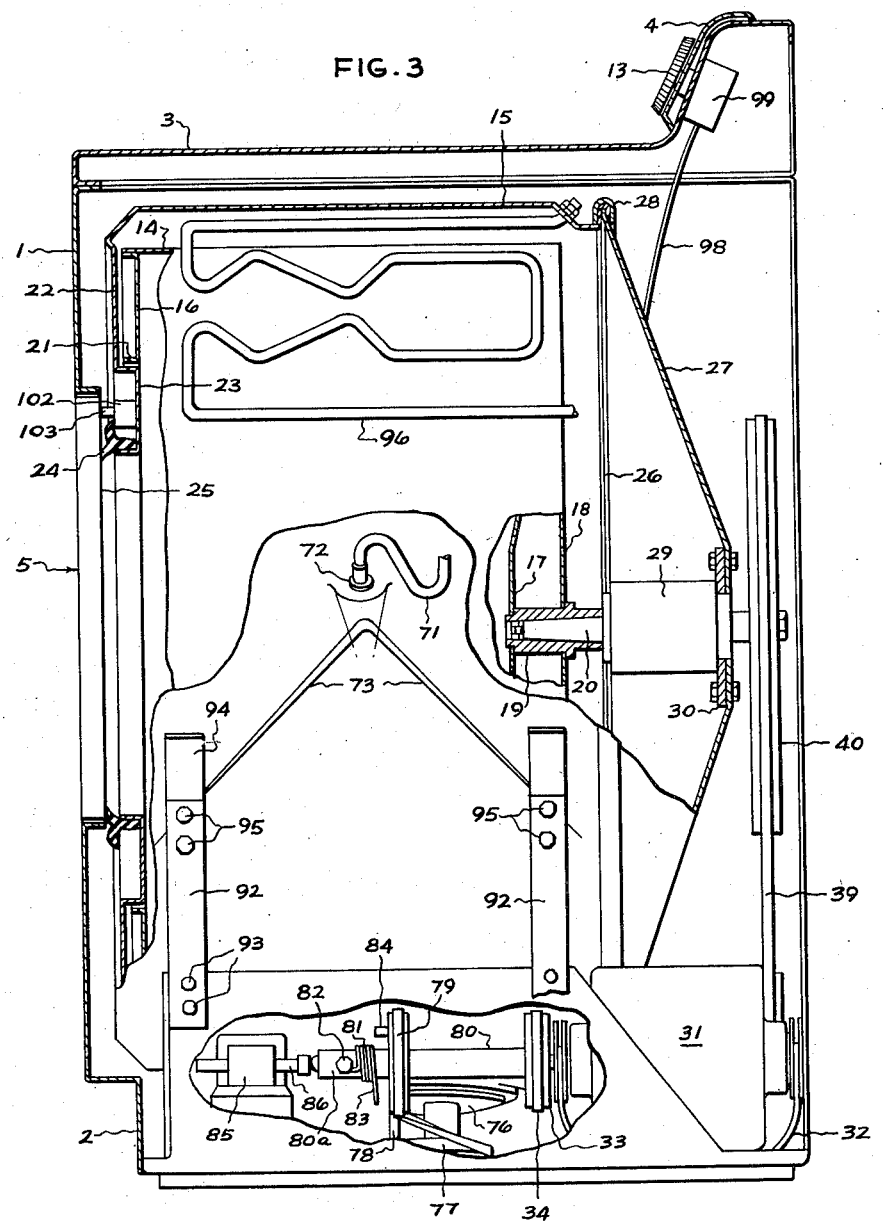
Fig. 3 is a cross-sectional elevation taken on the line 3—3 of Fig. 1, certain surfaces being partially broken away to illustrate details.

While not necessarily limited thereto, this machine is of the type having a clothes basket 14 (Fig. 3) mounted for rotation on a generally horizontal axis within an outer enclosing tub structure 15. Basket 14 is constructed with an outer cylindrical shell to which is secured a front wall 16, and a rear wall 17, the rear wall being reinforced by a plate 18. Secured centrally to rear wall 17 and reinforcing plate 18 is a hub 19 internally tapered to receive a basket drive shaft 20. Front wall 16 of the basket is flanged as at 21 to define an access or loading opening for the basket. The tub structure enclosing basket 14 similarly has a generally cylindrical portion and integral front wall 22 as shown by Fig. 3. This front wall 22 includes a channel 23 encircling the access opening into the basket. An annular sealing gasket 24 is carried by channel portion 23 and is arranged to seal against the inside surface 25 of access door 5. The rear wall of the tub is made up from a ribbed plate 26 and rearwardly extending conical reinforcing member 27. Plate 26 and member 27 are peripherally clamped by rolling a flange of plate 26 over member 27, which assembly is then sealed to the cylindrical wall of tub 15 by means of a clamping ring 28. This construction functions not only to provide a rigid tub assembly, but also to provide adequate support for a main bearing assembly 29 for shaft 20. As illustrated by Fig. 3, a strengthening plate 30 is secured to the outboard end of bearing assembly 29, and adjustably fastened to reinforcing member 27, thereby to permit centering of the rotatable basket within the tub during assembly. With this arrangement, shaft 20 is journaled within bearing assembly 29, and the basket is adequately supported even for high speed rotation with unbalanced loads.

In the usual manner, basket 14 is provided with appropriate internal lifting ribs or baffles (not shown), whereby articles of laundry contained therein are caused to rotate with the basket. At low rotational speeds, the articles are lifted to an elevation near the top of the basket whereupon they fall across the diameter of the basket, thus imparting a tumbling action effective both for washing in a liquid detergent and for subsequent drying by the application of heat. By rotating the basket at a higher speed, moisture may be extracted from the articles in the well-known centrifugal extraction process.

Power for rotating basket 14 at either speed is supplied in the present embodiment by means of an electric motor 31 secured to the base of the machine by means of a cradle 32. As shown most clearly by Fig. 2, an output pulley 33 on the motor shaft transmits power through a flexible belt 34 to input pulley 35 of a transmission assembly 36. The details of transmission assembly 36 are not illustrated herein, since such construction does not form a part of the present invention. It will be understood, however, that this transmission is of the type providing a speed reduction in one ratio for basket drive at tumbling speed, and with another ratio for centrifugal extraction. In the present instance, it is contemplated that transmission 36 will be automatically shifted from its ratio for tumbling speed to a ratio for extraction by energization of a spin solenoid 37. Obviously, however, other arrangements may be employed for shifting from tumbling speed to extraction speed, this invention requiring only that the shift take place responsive to an electrical signal in a manner to be pointed out hereinafter. A transmission output pulley 38 is connected by means of a flexible belt 39 to rotate a large diameter pulley 40 (Figs. 3 and 4) secured in any appropriate manner to main drive shaft 20 of the basket. With this arrangement, it is evident that when motor 31 is in operation, the basket 14 is rotated, at a tumbling speed or at centrifugal extraction speed depending upon energization of spin solenoid 37.

In the illustrated embodiment, flexible belts, such as V-belts are employed for the transmission of driving torque from the motor to the transmission assembly 36, and from the transmission assembly to the basket. Obviously, other types of driving connections might be employed, but for manufacturing reasons, and simplicity, flexible belts are preferred. It is, however, essential that the basket be rotating during operation of the machine as a safety precaution. Furthermore, it is desirable at all times that these driving belts remain taut. In the illustrated machine these safety precautions are accomplished by mounting transmission assembly 36 on a sled 41 having a compound movement.

Figure 2:
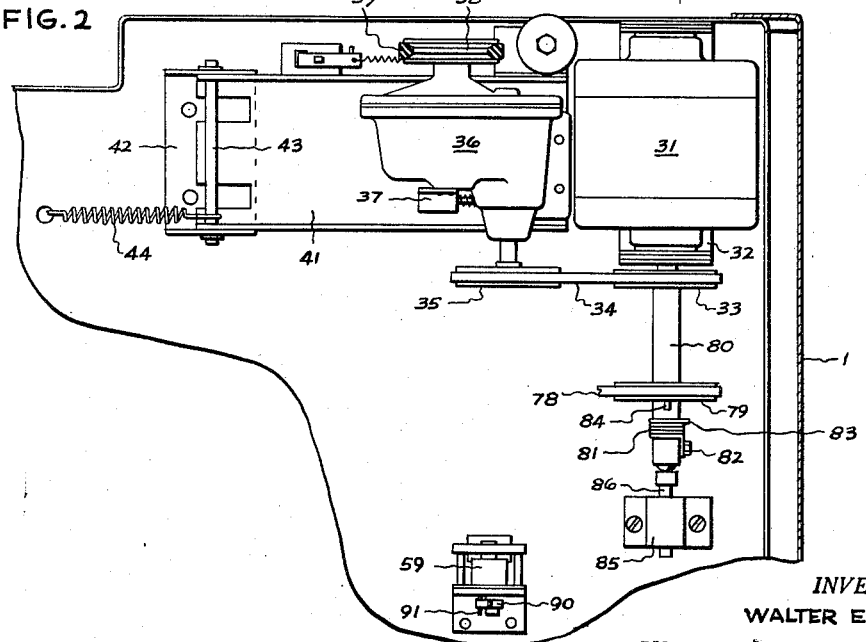
Fig. 2 is a partial cross-sectional plan view taken on the line 2—2 of Fig. 1.
Figure 4:
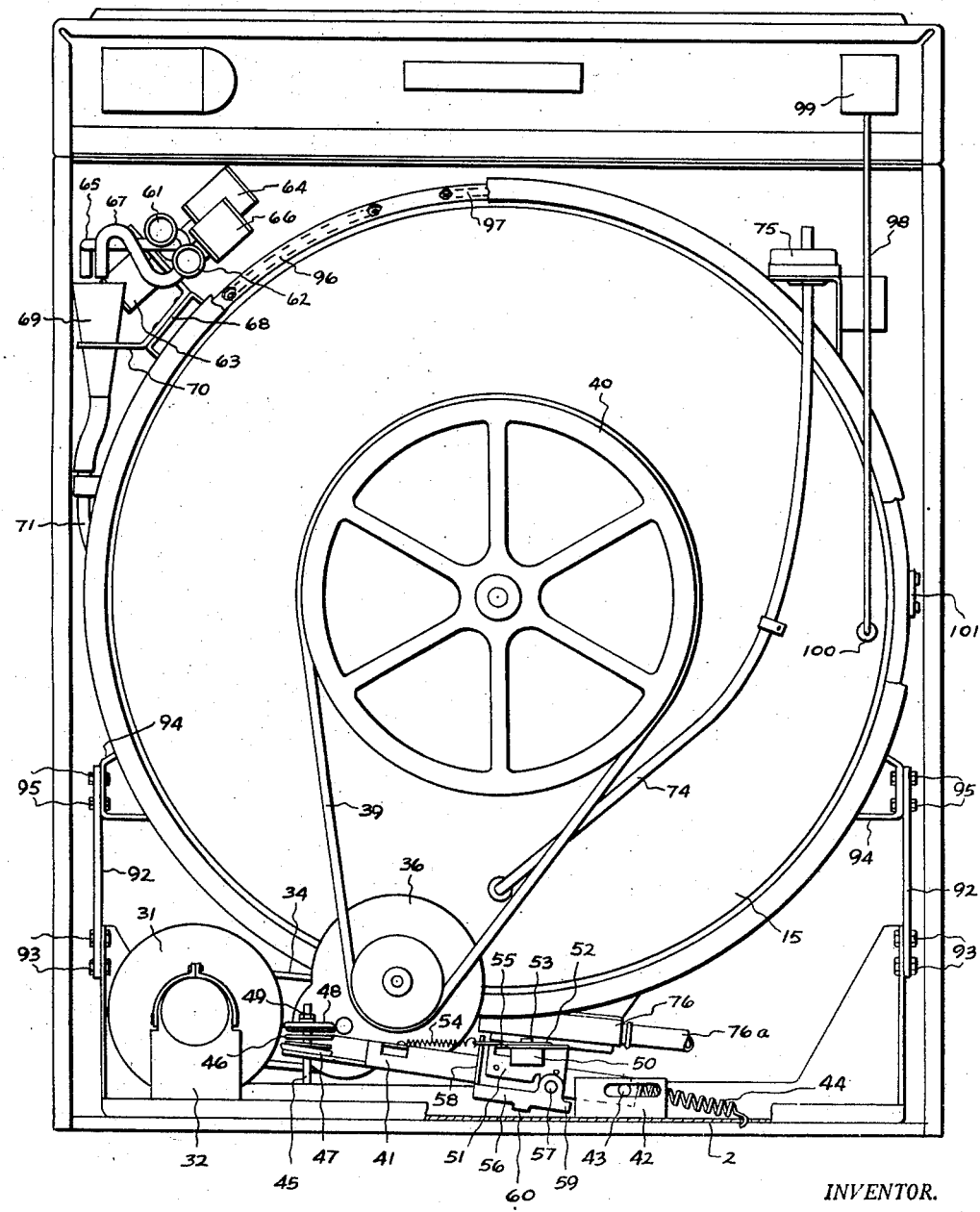
Fig. 4 is a rear view of the machine with the rear panel removed to illustrate details.

With respect to this sled arrangement, reference is made now in particular to Figs. 2 and 4 illustrating the sled 41 pivotally mounted with respect to the base by means of a bracket 42 which slidably and pivotally receives the ends of a sled mounting pin 43. As to the slidable movement of the sled, it may be noted that it is biased by means of a tension spring 44 to the left as viewed in Fig. 2, or to the right as illustrated by Fig. 4. Spring 44, being anchored to the base of the machine, thus functions to maintain the desired driving tension for belt 34.

Tension in drive belt 39 is maintained by means of the pivotal movement of sled 41 about the axis of mounting pin 43, as clearly shown by Fig. 4. In this instance, pivotal movement of the sled is guided by a vertical stud 45 projecting upwardly from the base. A compression spring 46 encircling stud 45 exerts a downward pressure on the sled through a lower bearing washer 47 and an upper bearing washer 48 held in position on stud 45 by a threaded fastening device 49. The force from spring 46 supplements gravitational force to provide desired belt tension. Thus, spring 44 maintains belt 34 under driving tension, while compression spring 46 and gravity maintain driving tension on belt 39.

If either belt fails, this invention contemplates protection of the machine by means of a belt switch. In the present instance, this switch 50 is a small toggle switch of the type readily available commercially. Switch 50 is carried by a bracket 51 riveted or otherwise secured to transmission sled 41. A slidable plate 52 fits over toggle 53 of the switch and is arranged such that if the slidable plate 52 moves toward the left as viewed in Fig. 4, the toggle likewise is moved to the left to turn the switch off. This switch actuating plate 52 is biased to the left by a spring 54 anchored as shown to the sled. The switch actuating plate is normally prevented from moving toward the left by means of a latching projection 55 engaging an upstanding corner on bracket 51. A trigger 56 is pivotally secured to the sled at 57 and includes an upwardly extending actuating arm 58 adapted to force the switch actuating plate 52 upwardly to disengage latch 55. Trigger 56 is arranged with a projecting portion 59 adapted to contact bracket 42 in the event of a failure of belt 34 and the consequent motion of the entire sled under the biasing force of spring 44. A projection 60 on trigger 56 is arranged to contact the base of the machine in the event of a failure of belt 39 and the consequent downward motion of sled 41 under the influence of both gravity and compression spring 46. Thus, failure of either belt will cause a pivotal movement of trigger 56 about pin 57, thereby moving the actuating arm 58 upwardly to disengage the switch actuating plate latch. Thereupon, the actuating spring 54 moves the switch actuating plate to the left, thus moving toggle 53 to trip the switch to its "off" position. Switch 50 can, of course, be re-set manually following a repair of the broken transmission belt.

For the machine of the type illustrated, an automatic water supply is provided whereby hot water may be furnished to the interior of the tub for washing, or warm water may be supplied as desired. Additionally, provision is made for supply of cold water for use in condensing moisture during the final drying operation. For these purposes, connections 61 and 62 are provided at the back of the machine for supply of hot and cold water respectively (see Fig. 4). Preferably, the valves are electrically controlled, and as shown in Fig. 4, a hot water valve solenoid 63 governs the entrance of hot water into the machine, while an opposed main cold water valve solenoid 64 regulates the cold water supply. The main hot and cold valves under control of solenoids 63 and 64 discharge through a common outlet conduit 65. Since this machine employs cold condenser water for the drying operation, an additional solenoid operated valve controlled by solenoid 66 regulates the supply of such cold water at a slower rate, adequate, however, for the condensation purpose. A separate discharge conduit 67 may be provided for this cold condenser water. As clearly shown by Fig. 4, these water valves are all secured together in a single unit and supported by means of a bracket assembly 68 on the upper portion of the tub.

It is, of course, important in applications of this type that a break or air gap be provided in each of the water inlet lines so that it is impossible for liquid to be siphoned from the machine to contaminate the water supply lines. Hence, as illustrated by Fig. 4, both discharge conduits 65 and 67 discharge into a common funnel 69 carried on an arm 70 of the valve supporting bracket. Funnel 69 is connected to a water inlet conduit and trap member 71 as shown by Figs. 3 and 4. This trap serves the useful function of preventing suds from rising into funnel 69 in the event the operator inadvertently uses an excessive quantity of detergent.

It may be noted also in connection with Fig. 4 that funnel 69 has a substantial liquid capacity in comparison with the capacity of the tubular conduit and trap 71. Condenser water is supplied through discharge pipe 67 at a rate less than the available flow capacity through trap and conduit 71. Hence, as condenser flow commences, water fills the trap and part of the funnel prior to commencement of flow into the tub. When flow starts, siphoning action continues this flow until the siphon draws air, whereupon flow ceases until the water level is again raised to the necessary level within funnel 69. With this arrangement, the condenser water is supplied to the interior of the machine in pulses.

As shown clearly by Fig. 3, the conduit 71 enters tub 15 through a fitting 72 at the apex of a liquid distribution bead 73. This liquid distribution bead functions to spread the incoming water over most of the axial length of the tub side wall. This construction, plus the arrangement described above to produce a pulsing action of the incoming condenser water, provides an arrangement whereby a very substantial portion of the area of the side wall of tub 15 is cooled, which cooled area therefore, acts as a condenser for the moisture extracted from the laundry during the drying operation.

In accordance with this construction, it is contemplated that the water level will be controlled automatically. As described hereinafter in greater detail, this water level control includes a single pole, double-throw switch actuated from its first position, when the machine is substantially empty, to its opposite position when the machine is filled to operating level. While there are a number of arrangements for actuating a switch responsive to water level, I have shown herein (see Fig. 4) a hydrostatic system employing a tube 74 which extends at its lower end into the washer tub. As the water level within the tub rises, air is compressed within tube 74 and the resulting pressure actuated a hydrostatic diaphragm operated switch assembly 75. The interior details of this switch are not shown herein, since such devices can be purchased commercially on the open market.

While liquid may be removed from the machine in several ways, such as by a gravity drain with a solenoid controlled drain valve, I have shown herein a construction wherein a drain pump 76 is secured to the bottom of tub 15. (Figs. 1, 3, and 4.) This pump may discharge through any suitable conduit or drain hose 76a. The pump is driven through its own drive pulley 77 rotated by means of a flexible belt 78 arranged as a right angle drive from a pulley 79 journaled on a two-part shaft extension, with parts 80 and 80a driven by motor 31.

It is to be understood that parts 80 and 80a rotate together, but 80a is permitted limited axial movement with respect to part 80. A clutching means is arranged to engage pulley 79 with the motor shaft extension, such a clutch being shown herein as a torsion spring 81 secured by means such as 82 to the shaft extension part 80a. This spring includes an outwardly projecting portion 83 engageable with an axially projecting lug 84 on pulley 79. An internal spring (not shown) normally forces the shaft extension part 80a axially to the left (Fig. 3), whereby the torsion spring 81 does not engage lug 84 of the pulley, and hence the pump does not operate. A solenoid 85 having a plunger 86 in axial alignment with the shaft extension is arranged to force the shaft extension part 80a toward the right (Fig. 3), thereby to engage clutch spring 81 with the pulley lug 84. The torsion spring 81 serves the function of absorbing the sudden shock when the drive to the pump is engaged. Thus whenever solenoid 85 is energized, pump 76 is effective to remove the liquid contents from the tub. Obviously, other arrangements could be employed, such as a separate pump motor, or a separate drain valve for a constantly operating pump, so long as drainage of the liquid from the machine is under the control of an electrical signal.

When the transmission is shifted from tumbling speed to extraction speed by energizing solenoid 37 as previously described, the distribution of clothing around the inside of the basket is entirely fortuitous. Consequently, conditions of unbalance must be expected. It is found in practice when serious unbalance occurs, that the condition may be remedied by a return from spin to tumbling speed for redistribution of the load. In some cases, repeated efforts to accelerate from tumble to extraction speed are required before a practically balanced load is attained. In accordance with the present embodiment, the machine includes an unbalance switch 87 (Fig. 1) which is actuated to return the machine to tumble in the event there is excessive vibration. Switch 87 is actuated by an adjustable disc member 88 threaded through a bracket 89 secured to the tub 15 of the machine. When the machine has been properly located, and before placing it into operation, the actuating disc 88 for the unbalance switch is adjusted, so that when vibration of the tub exceeds a predetermined amplitude, switch 87 will be tripped to its opposite position, whereupon the machine returns to tumble speed; and simultaneously an unbalance motor, presently to be described, comes into operation to rotate a star cam 90, which through a spring arm 91 functions to reset switch 87 to its original position, whereupon the machine returns to extraction speed. If necessary, this mechanism permits several redistribution periods, each followed by an attempt to achieved extraction speed, until conditions of satisfactory balance are encountered. With this construction, it is, of course, necessary that tub 15 be mounted in a manner permitting limited flexibility in a direction to actuate the unbalance switch. As clearly shown by Fig. 4, the tub is supported on relatively stiff members 92, four such members being employed in the illustrated embodiment, with two on each side of the tub. As illustrated further by Fig. 3, these supporting members 92 are in the form of flat steel straps or bars providing substantial rigidity in a direction from front to back, but which provide limited flexibility in a transverse direction. Each supporting bar 92 is secured by fastening means 93 to the base of the machine and to the tub through a bracket 94 and fastening devices 95.

Heat may be supplied to the machine both for water heating during the washing operation and for moisture evaporation during the drying operation by means of a multiple-section heating element consisting, for example, of sections 96 and 97 as indicated by Fig. 4. Each heater section, only two being shown in the present embodiment, may be arranged in a serpentine coil or pattern as indicated more clearly by Fig. 3. Preferably, these heating elements are of the sheathed type in which the resistance wire is maintained in spaced relation with an outer sheath by a highly compressed granulated insulating compound such as magnesium oxide. Such heating elements are sold under the trademark of "Calrod" and are available commercially. While I have referred to two separate heating elements, obviously, a single elongated heating element with a center tap could be employed, thereby providing two independent sections which can be independently controlled. The temperature of the machine may be controlled in a manner explained in greater detail in connection with the schematic wiring diagram of Fig. 5. However, as shown by Figs. 3 and 4, a temperature sensing tube 98 extends from the thermostat switch assembly 99 downwardly entering the tub through a sealing grommet 100, with the temperature sensing bulb located within the tub. Thus, the thermostatic switch assembly 99 effectively senses the temperature within the tub thereby to control the electric heating elements in a manner described hereinafter.

The heating elements for a machine of this general type are of substantial capacity, thus presenting some risk of over-heating. To obviate any chance of excessive temperature, it is preferred to employ an additional safety thermostat assembly 101 as shown by Fig. 4. This thermostat is of the type commonly available on the open market, which includes switching means and a thermally sensitive disc within a sealed casing. The particular function of safety thermostat 101 will become further apparent from the following description in connection with the electrical wiring diagram.

An additional safety precaution desirable in connection with machines of this type is to positively shut off operation of all elements of the device whenever access door 5 is opened. The controlling element for performing this function is herein shown as a plunger operated switch 102 positioned with its plunger 103 to be actuated by door 5 when it is moved to its closed position. (See Fig. 3.)

Figure 5:
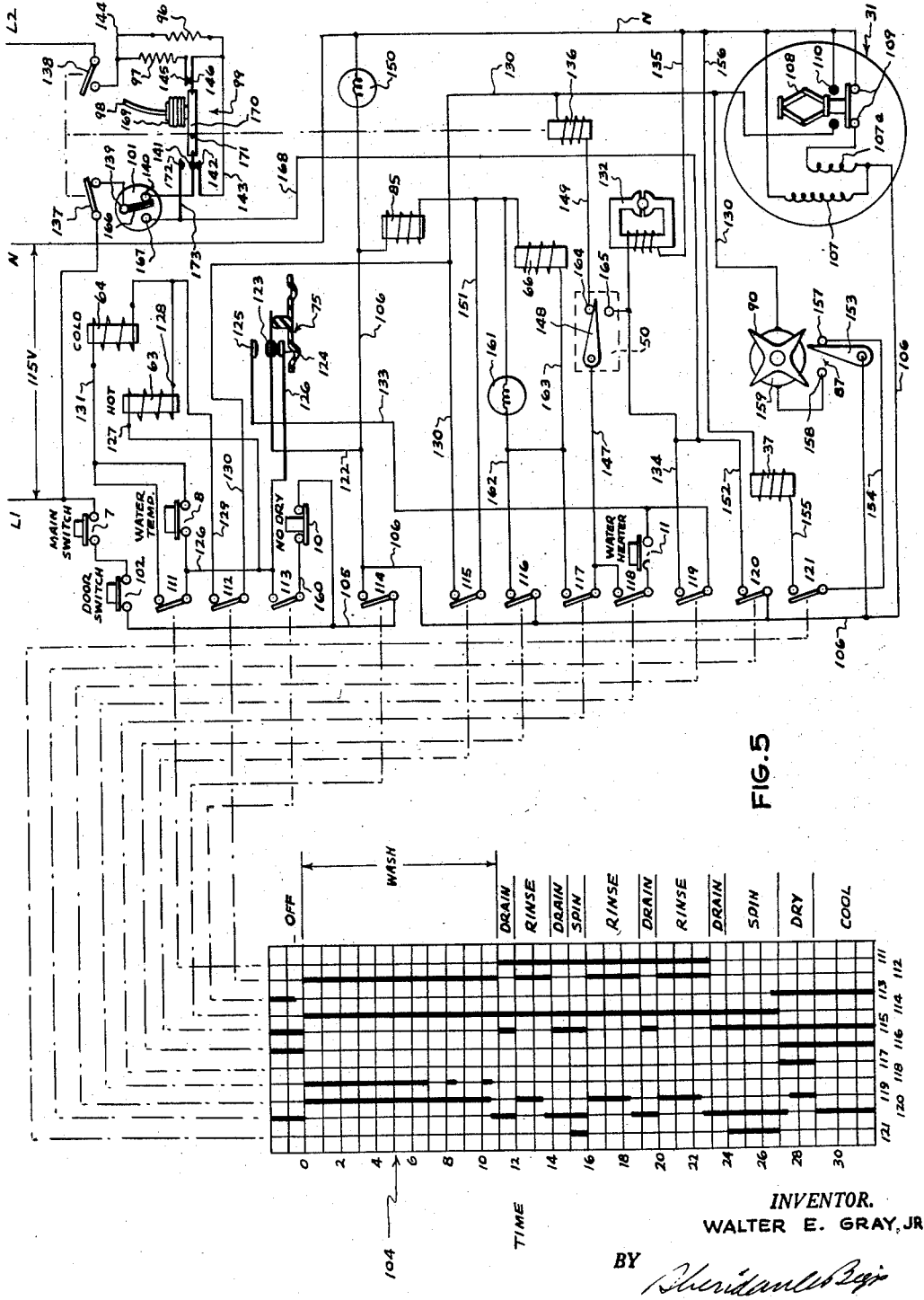
Fig. 5 is a schematic electrical wiring diagram and sequence control cam chart embodying an exemplary form of this invention.

Referring now to the schematic electrical diagram of Fig. 5, a control system for a combination washer and dryer is shown including an automatic sequence control with a series of switches 111 through 121 actuated in the desired sequences by appropriate switch operating means indicated schematically by cam diagram 104. Sequence controls generally are well known, and several types are commercially available. Therefore, the representation of Fig. 5 is primarily schematic, it being understood, however, that each of these switches 111–121 are actuated from their normally open position to a closed position by means such as cams. In the particular representation of Fig. 5, it is to be understood that each switch is connected to an actuating means as indicated by dot-dash lines, the switch being closed as a function of time as indicated by the heavy black lines on the cam diagram. For example, switch 111 is actuated to its closed position on the time scale from 11 to 23. A scale has been shown for time on the cam chart of Fig. 5, it being understood that this scale is not necessarily minutes but may correspond to the number of impulses given to advance the cams in the forward rotational direction. In other words, the chart of Fig. 5 may be regarded for the purposes of this application as a development of the peripheries of the respective switch operating cams, the heavy lines showing the cam rises which are effective to close respective switches.

Further details with respect to, and the operation of, this control system will become apparent by a review of a typical sequence of operations. Let it be assumed initially that the sequence control is set in the space just preceding zero on the time scale, that is, in the "off" position. Let it also be assumed that main switch 7 is manually closed, and that the door switch is closed. While cam actuated switches 115, 116, and 120 are closed, no power is supplied to any of the components from power supply lines $L_1$ and $L_2$ and N. I have shown herein three such electrical supply lines representing for example a 230 volt supply line between $L_1$ and $L_2$ with an intermediate neutral, so that the voltage between either line and neutral may be approximately 115 volts. If the sequence control is now manually advanced to a position slightly beyond zero, cam actuated switches 115, 116 and 120 are opened while switches 112, 114, 118, and 119 are closed. Closure of switch 114 completes a circuit to main drive motor 31 commencing with line $L_1$ through the main switch and door switch to a line 105, through switch 114 to a line 106. While the invention is not necessarily so limited, motor 31 is shown herein as the induction type having a main or run winding 107 and a start winding 107a. As the motor comes up to operating speed, a centrifugal mechanism 108 opens a start winding switch 109 and closes the circuit through a switch 110. As shown, main winding 107 of the motor has its opposite terminal connected to the electrical neutral, as does the starting winding 107a through centrifugal switch 109. Thus, closure of switch 114 causes operation of the main drive motor throughout the period of operation of the apparatus as a washing machine.

The automatic water fill control is effected through cam actuated switch 112. The electrical circuit for energization of the hot water valve through solenoid 63 may be traced from line $L_1$ through the main switch and door switch to line 105, cam actuated switch 114, to a line 122 leading to contacts 123 and 124 of the water level switch assembly 75. As shown, contacts 123 and 124 are normally closed when there is no liquid in the machine; but as the liquid rises, the hydrostatic actuating means rises, lifting contact 123 clear of contact 124, and at the same time closing a circuit from contact 123 to a contact 125. Thus, when the machine is empty a circuit is completed through the water level switch to a line 126 connected to a terminal 127 of the hot water control solenoid. The opposite terminal 128 of the hot water solenoid is connected through a line 129 to cam actuated switch 112, which when closed, completes a circuit to a line 130. Line 130 is connected to the electrical neutral through the normally open contacts 110 of the centrifugal switch in the motor, and thus the circuit for energization of a water valve requires as a prerequisite operation of the motor at normal speed. From this circuit, it may be seen that energization of a water valve is dependent first on closure of cam operated switch 114; secondly, upon the closure of contacts 123 and 124 indicating that the machine does not have normal liquid level; closure of cam actuated switch 112; and closure of contacts 110 of the motor centrifugal switch when the machine is operating at normal speed.

It may be also noted at this point that cold water valve solenoid 64 may be energized simultaneously with the hot water valve solenoid by closure of the manual water temperature switch 8, to complete a circuit from line 126 to a line 131. The opposite terminal of the cold water valve solenoid is connected to line 129. Thus, closure of manual switch 8 places both hot and cold water valve solenoids in electrical parallel.

An electro-magnetically operated drive means is provided for advancing the sequence control as a function of time. In the present embodiment, Fig. 5, I have shown such a drive means in the form of a timer motor 132. It is to be noted however that timer motor 132 does not commence operation to advance the sequence control until such time as the machine has been filled to normal operating level. As the liquid level in the machine rises, water level control means 75 closes contacts 123 and 125 when normal liquid level is achieved. The circuit is then completed from main line 105 through cam switch 114, line 122, contacts 123 and 125 of the water level control, to a line 133, connected through cam actuated switch 119 to a line 134, this line being connected to one of the terminals of timer motor 132. The opposite terminal of the timer motor is connected to the electrical neutral through a line 135.

In the illustrated machine the heaters 96 and 97 serve as a means for maintaining and increasing the temperature of the washing liquid. While these heaters, being mounted within the upper portion of the tub, as shown by Fig. 4, are not immersed in the liquid in the machine, there is a substantial heat transfer from the heaters to the rotating basket 14. Since the basket dips into the liquid as it rotates, and since a convective current is created, an effective heat transfer means is provided between the electrical heating elements and the washing liquid. Operation of the electrical heating elements for maintaining and increasing the liquid temperature is under the control of a manual water heater switch 11 and cam actuated switch 118. As additional safety precautions, this control system is arranged so that the water heating means cannot be energized unless the machine contains normal operating level of liquid, unless both drive belts are operative, and unless the main drive motor is rotating at normal speed. Since the heating elements draw a substantial electrical current, it is preferable, though not essential, to employ an electromagnetically operated relay for the heating elements. As shown by Fig. 5, this relay is operated by a solenoid or coil 136, which in a well-known manner is effective when energized to close switches 137 and 138. Heating element section 96 is energized through this relay by a circuit commencing with line $L_1$, switch 137, and safety thermostat 101, which when cool completes a circuit from a terminal 139 to a terminal 140; continuing through normally closed contacts 141 and 142 of the dryer control assembly 99, a line 143, heating element section 96, line 144, heater relay switch 138 to line $L_2$. The other section 97 of the heating element is energized through the same circuit to line 143, and then through normally closed contacts 145 and 146 of dryer control assembly 99, to heating element 97, line 144, and through the relay to the other side of the line. Thus, when relay 137—138 is closed, both sections 96 and 97 of the heating element are energized in electrical parallel, assuming the safety thermostat and the dryer control are both relatively cool and hence in circuit closed positions.

From the standpoint of the control system, the water heating means can be energized by applying power to the terminals of relay coil 136. This is accomplished by a circuit commencing with line $L_1$ and through main switch 7, door switch 102, line 105, cam actuated switch 114, line 122, contacts 123, 125 of the water level switch, line 133, the manual water heater switch 11, cam actuated switch 118, to a line 147, a movable contact arm 148 of belt switch 50, terminal 164, line 149 to one terminal of relay coil 136. The opposite terminal of the heater relay coil is connected to line 130, which, as previously explained, completes the circuit to the electrical neutral through the centrifugal switch in the main motor. It is thus seen, that operation of the water heating means depends not only upon closure of the main switch and the door switch, but also of the water level switch, the manual water heater control switch, the cam actuated switch for the heater control, the belt switch, contacts of the heater relay, the safety thermostat, and with the additional safety protection offered by the dryer control switches in a manner which will be described presently. As shown, cam actuated switch 118 for water heating remains closed through the first seven time intervals as shown by cam chart 104. During this period of the washing operation, the heating capacity is sufficient to actually increase the temperature of the washing liquid. This is desirable in many applications, either to conserve the supply of domestic hot water, or to supplement the heating capacity of the domestic hot water system. During the latter portion of the wash cycle, the heater is cycled from on to off for short periods, in a manner calculated to maintain substantially the same water temperature; or in other words, sufficient heat is imparted to the wash water to compensate for thermal losses. At all times, of course, the operator may control operation of the water heater by means of manual water heater switch 11.

As previously described, timer motor 132 advances the sequence control during the wash cycle commencing with that moment when the water level switch signals that there is normal liquid level within the machine. At 11 on the cam chart time scale, the wash period terminates, and the spent wash water is discharged from the machine by energizing pump clutch solenoid 85 as previously described. As shown, pump solenoid 85 is energized through cam operated switch 115 by a circuit from line 105, through cam actuated switch 114, line 106, pump solenoid 85, a line 151, cam actuated switch 115, line 130, the motor centrifugal switch, to the electrical neutral.

It may be noted also that slightly prior to closure of cam switch 115 for pump operation, cam operated switch 120 closed in order to maintain the sequence control timer motor in operation regardless of the position of water level switch 75. This is essential, of course, since otherwise the timer motor would cease operation whenever the liquid was drained from the machine. This auxiliary timer motor circuit may be traced from line $L_1$ and line 105, through cam switch 114, line 106, cam actuated switch 120, a line 152, to line 134, and the timer motor, and thence to the other side of the line as previously described.

Concurrent with energization of the drain solenoid 85, cam actuated switch 111 is closed preparatory to the filling operation for the first rinse. Since it is adequate for the rinsing operations to have a mixture of half hot and half cold water, cam actuated switch 111 functions to connect both water valve solenoids in electrical parallel, although this feature is not essential.

Upon conclusion of the drain period, cam actuated switch 112 closes to initiate the fill operation for the first rinse in a manner as previously described in connection with the initial wash fill. Cam actuated switch 120 is opened, while cam actuated switch 119 is again closed so that further operation of the timer motor is again dependent upon closure of contacts 123 and 125 when normal liquid level exists within the machine. These circuits likewise were described in connection with the initial fill for the wash period.

Following the first rinse, which is completed at point 14 on the cam chart time scale, the first rinse water is drained from the machine by energizing pump solenoid 85 through cam actuated switch 115 as previously described. Again, cam actuated switch 119 opens while cam actuated switch 120 closes to continue the sequence control drive in operation in spite of opening of the circuit through contacts 123 and 125 of the water level control when water is drained from the machine. Adequate time is provided by the sequence control from 14 to 15 for the water to drain or be pumped from the machine. At point 15, cam actuated switch 121 closes to complete a circuit to the spin solenoid commencing with line $L_1$ and line 105, through cam actuated switch 114, line 106, a movable contact 153 of the unbalance switch 87, to a contact 157, a conductor 154, cam actuated switch 121, and conductor 155 to spin solenoid 37. The opposite terminal of the spin solenoid is connected through a conductor 156 to the electrical neutral.

If by chance the articles of clothing are distributed evenly around the inside of the rotating basket, the machine will rapidly accelerate the basket to centrifugal extraction speed. If, however, due to uneven distribution, vibrations of a predetermined amplitude exist, the unbalance switch will be actuated, moving contact arm 153 from contact 157 and into engagement with contact 158. The spin solenoid is thus released, and the machine returns to tumbling speed for redistribution of the load. From contact 158 of the unbalance switch, a circuit is completed to an unbalance timer motor 159, the other terminal of this timer motor being connected to line 130 and thence to the electrical neutral through the motor centrifugal switch. It is thus seen that vibration exceeding a predetermined amplitude breaks the circuit to the spin solenoid by movement of contact 153 of the unbalance switch from engagement with the contact 157; while simultaneously a circuit is completed from movable contact 153 to contact 158 of the unbalance switch, thereby energizing the unbalance motor to rotate star cam 90 in a manner causing switch 87 to reset to its original position after a time delay. This resetting of the unbalance switch de-energizes the unbalance timer motor and completes again the circuit to the spin solenoid. With this arrangement, it is possible that the machine may attempt acceleration to extraction speed several times before finally attaining a balanced clothes load permitting smooth, vibration-free performance. Severe vibration can never occur since high speed operation is terminated whenever objectionable excursion of the tub with respect to the base occurs.

Throughout the spin period, or throughout the attempts to accelerate the basket to extraction speed, the sequence timer motor 132 is in operation to advance the sequence control and, of course, the pump solenoid 85 is energized so that liquid extracted from the laundry is discharged to a drain. Upon conclusion of this extraction period, the sequence control switches are again returned to positions to cause the machine to refill with rinse liquid and to operate at tumbling speed. The rinse fill and rinse operations are identical with those previously described. Preferably, and as shown on the sequence control chart, a third rinse operation is provided before commencement of the final drain period at 23 on the time scale of the sequence control. This final drain is preparatory to the final spin dry operation, which is the centrifugal extraction operation immediately preceding the application of heat for the final drying period. Throughout the final extraction and drying periods, of course, sequence control switch 115 is closed, thereby energizing the pump solenoid 85. The centrifugal extraction is controlled, as previously described, by energizing spin solenoid 37 through cam actuated switch 121 and the unbalance switch 87. The sequence control timer remains in operation under the control of sequence control switch 120, also as previously described. This final centrifugal extraction operation ends at 27 on the time scale when cam actuated switches 114 and 121 open.

If the operator desires to terminate further machine operation, the "omit dry" button 10 may be pressed, and then when the machine concludes the final extraction period, further operation will cease. However, assuming that the "omit dry" button is not depressed, the machine will go into a final drying period automatically with application of heat to extract all of the moisture or substantially all of the moisture from the articles of clothing.

Assuming now that the "omit dry" button has not been depressed, it may be noted that upon conclusion of the final extraction period or slightly prior thereto, cam actuated switch 113 closes, thereby to supply power to the machine for the balance of the drying operation. As shown, a circuit is completed from line $L_1$ to conductor 105, the "omit dry" switch 10, a conductor 160, sequence control switch 113, conductor 126, contacts 123 and 124 of the water level control switch (closed when the machine is substantially empty), and conductor 122 to line 106, line 106 supplying electrical power to other components of the control system. It is thus apparent that when switch 114 of the sequence control subsequently opens, operation of the main drive motor continues through sequence control switch 113 and the water level switch. The water level switch in this circuit functions therefore as a flood control switch preventing operation of the machine as a clothes dryer in the event that there is a substantial accumulation of liquid in the machine. At the beginning of this final dry period, cam actuated switch 116 is closed to apply power from line 106 both to a dry indicator light 161 through a conductor 162, and to a condenser cold water valve 66 through conductor 163. Dry indicator light 161 and condenser water valve 66 are in electrical parallel, their circuits being completed through conductor 151 and sequence control switch 115 to line 130, and thence to the electrical neutral through the motor centrifugal switch. It is essential that the pump solenoid remain energized throughout heat drying so that the drain pump is constantly effective during the drying operation to dispose of condenser water. This circuit to the pump solenoid commencing with line 105 continues through the "omit dry" switch 10 and sequence control switch 113 through the water level switch, to line 122, to line 106, pump solenoid 85, line 151, sequence control switch 115, to line 130 and to the electrical neutral through the motor centrifugal switch.

The electrical heating means for drying is energized by means of sequence control switch 117. The circuit to heater relay solenoid 136 may be traced from line 105 through the "omit dry" switch, sequence control switch 113, contacts 123—124 of the water level switch, conductor 122 to conductor 106, sequence control switch 116, conductor 162, conductor 163, sequence control switch 117, conductor 147 through the belt switch 50, to the conductor 149 and the heater solenoid, the circuit being completed through line 130 and the centrifugal switch to the electrical neutral. The heater solenoid or relay coil closes contacts 137 and 138 as previously described, to apply power through safety thermostat 101, and normally closed contacts 141, 142 and 145, 146 to heater sections 96 and 97. It may be noted that the water level switch is now acting as a flood switch. Thus, if water accumulates in the machine to a level opening switch 123—124, the machine is immediately shut-down, since this switch is in the main power line for dryer operation.

As the dry period commences, the sequence control timer 132 may continue in operation since sequence control switch 120 is closed, supplying power from conductor 106 through lines 152 and 134, to the sequence control motor 132, and line 135 to the electrical neutral. Shortly after the drying period commences, sequences control switch 120 opens thereby terminating further operation of the timer motor under normal circumstances. If desired, the control timer may be deenergized from the very beginning of the heat drying period, although the arrangement shown is preferred. There are, however, safety circuits which may be energized to resume operation of the sequence control timing motor so that it will "time out" and stop operation of the machine. A first safety control feature lies in the use of the belt switch which functions to move contact arm 148 from contact 164 to contact 165 upon a failure of either of the belts in the transmission to the basket. Thus, if either belt breaks, the power supply to the heater relay coil 136 is immediately broken, and power is supplied through the belt switch to contact 165, which is connected to line 134 leading to the timer motor of the main sequence control. Hence, belt breakage immediately terminates heater operation and commences the sequence control to terminate completely machine operation.

Another safety control feature comprises the over-temperature protection provided by the safety thermostat 101 and temperature control assembly 99. Looking first to safety thermostat 101, if the bimetallic element 166 becomes heated to a predetermined high temperature, it snaps from engagement with contact 140 to engagement with contact 167. Heater operation is terminated immediately. At the same time, a circuit is completed from line $L_1$, through heater relay 137, the bimetallic element 166, contact 167, a conductor 168 to conductor 134 leading to the timer motor. Thus, actuation of the safety thermostat functions not only to terminate operation of the heating elements, but also to energize the timing motor of the main sequence control, which thereafter functions to drive the sequence control to its "off" position, terminating machine operation.

Besides these safety circuits which energize the timer, still another safety precaution protecting the machine against an over-temperature condition lies in the use of the centrifugal switch 110 in the main drive motor in the circuit with the heater relay coil. Thus, if the main drive motor ceases to operate for any reason, switch 110 is opened, and the heater relay is de-energized. The timer is, however, not energized in this instance.

It will be noted, of course, that none of the above-described safety controls for the heating elements come into effect unless an abnormal condition prevails.

Under normal circumstances, system operation and heating element operation during drying is controlled by the temperature control assembly 99. As described in connection with Fig. 4, a temperature sensing bulb is located within the machine and is connected by a hydraulic line 98 to the temperature sensing control assembly 99. Within the control assembly 99, as shown in Fig. 5, is a temperature responsive actuator 169 arranged, by way of example, to rotate a switch actuating arm 170 about its pivot point 171. As the temperature within the machine rises, expansion of member 169 rotates switch actuator 170 first to open the circuit between contacts 145 and 146, thus de-energizing section 97 of the main heating element. In a typical machine, this initial trip point, opening contacts 145 and 146, might occur at 214° F. to 216° F. As an example, with a total wattage of 4000 watts in both heater sections, it is contemplated that heater section 97 would be approximately 1200 watts. Thus, this initial switch opening reduces the wattage applied for drying the clothes from 4000 to 2800. As the temperature rises further within the machine, contacts 141 and 142 open, thereby to de-energize the remaining heater section 96. Simultaneously, contact 141 comes into engagement with switch contact 172 connected through a conductor 173 to conductor 168 leading to the timer motor driving the sequence control. It is thus seen that during a normal drying operation, the timer for the sequence control does not operate until the second trip point is reached by the temperature control assembly. This second trip point in a typical example might be in the range of 18° to 20° above the initial trip point.

After an actuation of the temperature control to open contacts 141 and 142 and close 141 with 172, the device does not reset immediately due to the existence of an inherent differential within the switch as well as thermal inertia effects in the over-all system. However, timer motor 132 is in operation as previously described. Within a fairly short period of time after commencement of operation of the timer motor, the sequence control is driven to a position (29 on the time scale) to open switches 117 and 119, with simultaneous closure of cam actuated switch 120. As previously explained, switch 117 of the sequence control is in the circuit to heater relay 136, and therefore when this switch opens, it is no longer possible, regardless of the setting of the temperature controls, to energize the heating elements. The opening of switch 119 and closure of switch 120 supplies power directly for operation of the sequence control motor 132, regardless of the condition of temperature control device 99. Switches 113, 115, and 116 remain closed however to continue the machine in operation to tumble the clothes, with flow of condenser water on the inside wall of the tube, and with operation of the pump solenoid to dispose of such condenser water. In other words, the machine continues in operation for a cool-down from the end of the heater operation until the sequence control finally drives itself to the "off" position, when cam actuated switch 113 opens. At this point, the machine ceases operation entirely, it has cooled down, and dry clothes may be safely and comfortably removed.

It may be recalled in connection with Fig. 1, that a dryer control knob 13 is provided. Preferably, dryer indicator light 161 shown by Fig. 5 is incorporated behind this control dial or knob so that it is lighted whenever the machine is in the dry portion of its cycle of operations. This knob may be arranged in any desired fashion so that adjustment of knob 13 effectively changes the location of pivot point 171 of the switch actuating lever with respect to thermal actuating element 169. By such an arrangement, peak drying temperatures may be selected by the operator, making the machine universally adaptable to various drying loads and fabric types.

It is desirable for optimum operation of this dryer control system to properly proportion heater sections 96 and 97 with respect to the first and second cut-off temperatures of the thermal control assembly 99. Initially, of course, it is desirable to use the maximum wattage in the heaters without excessive risk from over temperature. For example, in a domestic machine wattages in the neighborhood from 3500 to 5000 watts appear to be practical. Once maximum wattage has been selected, characteristics can then be plotted of temperature against time for various normal cotton loads. For example, a four-pound load of relatively light weight cotton articles, a four-pound load of heavy articles such as towels and the like, and eight-pound light and heavy loads are checked, plotting the performance curves of temperature against time for each load. The second trip point, or in other words the highest temperature achieved prior to operation of the device to open contacts 141 and 142, is selected as that temperature corresponding to a substantially dried load for that load having the highest moisture retention. In practice, it is found that this is usually the lowest "dry" temperature of the various load curves plotted as above. The wattage of the basic heater section 96 may then be selected as that value which will limit a relatively light load to a temperature plateau slightly below the second trip point or high cut-off temperature. The first or lower cut-off temperature may then be selected as that value which will prevent excessive temperature over-shoot when the auxiliary heater section 97 is de-energized; it being essential that such temperature over-shoot does not exceed the second cut-off temperature. Selection of wattages and cut-off temperatures, as outlined generally above, is intended for normal loads consisting predominantly of cottons and linens in a standard weight fabric range. If an adjustable connection is provided between the thermal actuator and the switch assembly, lower operating temperatures can be provided for drying synthetics; while a higher temperature range may be selected for special loads of extra heavy fabrics. This particular embodiment also discloses a two-section heater and dual temperature level thermostat. If desired, a multiple section heater could be employed with a switch bank arranged in cooperation with the thermal actuator to gradually decrease the wattage as the temperature rises.

The nature of the control system may becomes more apparent by review of a typical cycle of operations. The machine is, of course, first loaded with the articles to be laundred and a measured quantity of detergent is added. The operator initially selects the desired water temperature by depressing a push button 8 or 9 for hot or warm (Fig. 1), and the desired washing period by adjusting the rotary position of knob 12. In practice, the water temperature control buttons may be arranged through a mechanical linkage to close main switch 7 whenever either switch is depressed. Hence, when the door is closed, closing door switch 102, the machine immediately commences to fill with washing liquid. However, the timed washing period does not commence until the machine has filled with liquid to operational level, under the control of the water level sensing switch assembly 75.

If it is desired to increase the wash water temperature during the washing operation, the operator may depress water heater push button 11. The machine is protected, however, against any risk of over-heating or damage since the water heating means cannot become energized unless there is an adequate water level in the machine, the drive to the machine is effective to rotate the basket, and safety thermostat 101 and temperature control assembly 99 are in their normal positions corresponding to relatively cool and safe temperature conditions.

Upon conclusion of the washing operation, the washing liquid and detergent solution is drained from the machine on a time basis, followed by a refill for the following first rinse operation. This filling operation, as are all other filling operations during the complete cycle of the machine, are under the control of the liquid level control assembly 75 and are performed independently of time.

After this first rinse operation, the machine is again drained and the clothes basket is rotated at a high speed to extract centrifugally the liquid from the clothes. During centrifugal extraction, the machine is protected by the unbalance switch arrangement, so that if vibration at any time exceeds a predetermined amplitude, the machine is returned to a tumbling speed; followed by a further attempt to accelerate to centrifugal extraction speed after a short time delay. In connection with spin solenoid 37, it may be noted that its circuit is not completed through centrifugal switch 110 in electric motor 31. This is desirable to provide smooth operation. There is some risk that the motor will slow down upon an attempt to accelerate the basket to extraction speed, and this decrease in speed might be sufficient to open centrifugal switch 110 in the circuit to the spin solenoid if it were included therein. This would, of course, cause the transmission 36 to return to its low speed or tumbling position. The motor would then speed up and close the switch 110. The spin solenoid being again energized would try to place the machine in spin. But the motor would once again slow down, open the switch 110, and drop out the spin solenoid. Several rapid attempts of the same type might well follow. Such oscillation is, of course, obviated with the circuit as shown.

After one or more additional rinses performed as described above, the machine may be drained on a time basis preparatory to final centrifugal extraction. Upon conclusion of this final centrifugal extraction period, the control automatically conditions the machine for a final dry period with application of heat.

If dry control switch 10 is closed, the sequence control automatically continues the machine in operation, with application of heat to extract moisture from the clothes and with discharge of condensate and condenser water to the drain. While the timer driven sequence control commences the machine in operation for drying, the actual control period is provided by the thermal control assembly 99. Throughout the drying operation, cold water is supplied to the interior of the machine to condense the evaporated moisture from the clothes. The drain pump is, of course, operating throughout. The heater relay, drain control solenoid, and condenser water valve solenoid are connected in series with the motor centrifugal switch so that they may be in operation only when the motor is operating. During the drying operation, the water level switch assembly functions as a flood switch to prevent operation of the machine in the event that there is excessive water present.

While the sequence control timer motor is not in operation for heat drying under normal circumstances, it is arranged to resume operation in the event of belt failure in the power transmission imparting rotation to the clothes basket; or in the event there is an overtemperature condition as sensed by the safety thermostat 101. Finally, the main sequence control is employed to advance the control upon conclusion of the drying operation to provide a cool-down period, during which the clothes are tumbled without application of heat. Upon conclusion of the cool-down period, the sequence control is advanced to an "off" position for shut-down of machine operation. From this position, the control can be manually advanced to commence a new cycle of operations.

While the present invention has been described by reference to a particular embodiment thereof, it is to be understood that numerous modifications may be made by those skilled in the art without actually departing from the invention. It is, therefore, the aim of the appended claims to cover all such equivalent variations as come within the true spirit and scope of the invention.

What I claim as new and desire to secure by Letters Patent of the United States is:

1. In a control system for a combination washer-dryer machine including a tumbling basket and an electrically operated water valve, electrically operated drain means for removing water from the machine, electrical heating means, a multiple speed transmission for rotating said basket including electrically operated shift means energized to shift the transmission from a basket tumbling speed to a basket extraction speed, an unbalance switch, electrically operated means for resetting said unbalance switch, a sequence control for operating the components of the machine in the desired sequence of operations, electrical drive means for said sequence control, a main drive motor, a centrifugal switch within said main drive motor operated to its closed position upon attainment of normal motor speed, said centrifugal switch being in the electrical circuit in series with said water valve, said electrically operated drain means, said electrical heating means, and said unbalance switch reset drive means, said electrical sequence control drive means and said speed shift means operating independently of said centrifugal switch.

2. In a control system for a combination washer-dryer machine, a plurality of electrically operated control components for filling the machine with washing liquid, for washing laundry in the liquid, for draining liquid from the machine, and for extracting liquid centrifugally and by heat, a sequence control for causing the machine to perform a sequence of filling washing, rinsing and extracting operations, a main drive motor, a centrifugal switch operated from open to closed position when said motor is operating at normal rated speed, and an electrical circuit for said control components including in series circuit relation therewith said centrifugal switch.

3. In a control system for a combination washer-dryer machine, an electrically operated water valve, electrically operated drain means for removing water from the machine, electrical heating means, a sequence control for operating the components of the machine in the desired sequence, a main drive motor, a centrifugal switch within said main drive motor, operated from an open to a closed position upon rotation of the motor at normal speed, said centrifugal switch being in electrical series circuit relation with said water valve, said electrically operated drain means, and said electrical heating means.

4. In a control system for a combination washer-dryer machine, an electrically operated water valve for filling the machine with liquid, an electrically operated drain means for removing liquid from the machine, a sequence control for causing the machine to operate through the desired sequence of operations, a main drive motor, a centrifugal switch operated from an open position to a closed position upon rotation of the drive motor at normal rated speed, a control circuit including said water valve and said electrically operated drain means, said centrifugal switch being in series circuit relation with said water valve and said electrically operated drain means.

5. In a clothes washer-dryer, a basket for tumbling articles of laundry, a drive motor for said basket, a centrifugal switch operated by said motor and closed during motor operation at normal speed, heating means, automatic water valve means, pump means, and an automatic control system including said centrifugal switch, said centrifugal switch being in series with each of said means, whereby the motor must be operating at normal speed for energization of any one of said means.

6. In a clothes washer-dryer, a basket for tumbling articles of laundry, a drive motor for said basket, an access door for said tumbling basket, a door switch actuated to closed position when said door is closed, a centrifugal switch operated by said motor and closed during motor operation at normal speed, heating means, automatic liquid fill means, and pump means, said centrifugal switch and said door switch being in series with each of said means whereby the motor must be operating at normal speed and the access door must be closed for energization of any one of said means.

7. In a combination washer-dryer, an electrical sequence control including a plurality of sequentially operating switches for controlling the cycle of operations, a timer for driving said sequence control, means for operating said timer comprising a first sequence control switch, a water level switch, a second sequence control switch, a thermostatically controlled switch, a safety thermostat switch, and an operation sensing switch, said timer being energized through said first sequence control switch and said water level switch during fill and wash periods, through said second sequence control switch during centrifugal extraction periods, and through said thermostatically controlled switch, said safety thermostat switch, and said operation sensing switch in electrical parallel during dry periods.

8. In a combination washer-dryer having a washing operation and a drying operation, electrically operated fill means, electrical heating means, a sequence control including a plurality of sequentially operated switches for controlling operation, an electrical drive for said sequence control, said sequence control including a control switch for said electrical drive, a water level switch, said sequence control drive during the washing operation of said machine being de-energized by said control switch during liquid filling and being energized by said water level switch upon attainment of operating water level, said sequence control including means to energize said electrical heating means for drying operation and concurrently to de-energize said sequence control drive, thermostatic means sensitive to temperature within the machine, and switch means closed by said thermostatic means upon existence of a predetermined high temperature to energize said sequence control drive means.

9. In a combination washer-dryer including a tumbling basket, a drive source and transmission for rotating said basket, electrical heating means for drying the clothes within said basket, a sequence control including a plurality of sequentially operated switches for controlling operations of the machine, an electrical drive for said sequence control, for advancing it through a sequence of operations to a final off position, said sequence control including a control switch for said electrical drive, said sequence control also including means to energize said electrical heating means for a drying operation with concurrent de-energization of said sequence control drive, means sensitive to operation of said transmission rotating said basket, and switch means operated by said transmission sensing means and closed upon failure of said transmission to rotate said basket, said switch means being in the circuit with said electrical sequence control drive to operate said drive independently of said sequence control switch.

10. In a combination washer-dryer, electrical heating means, a sequence control for causing a series of operations of washing, rinsing, extracting and drying, an electrical drive for said sequence control, a control switch for said electrical drive within said sequence control, said sequence control including means to energize said electrical heating means at the start of the drying operation with concurrent de-energization of said sequence control drive, manually adjustable thermostatic means sensitive to temperature within the machine, switch means closed by said thermostatic means upon existence of a predetermined high temperature to energize said sequence control drive means independently of said control switch and to de-energize said heating means, and a safety thermostatic switch sensitive to temperature within the machine to close a switch upon existence of a predetermined higher temperature to energize said sequence control drive means and to de-energize said heating means.

11. In a combination washer-dryer, an electrically operated water inlet valve, an electrical sequence control including a plurality of switches for controlling operation of the machine, a timer for driving said sequence control, electrical heating means effective to heat water during a washing operation and to evaporate moisture from clothes during a drying operation, a water level switch closing a first circuit when empty and closing a second circuit when the machine is filled with liquid to an operating level, operation of said electrical heating means for heating water being dependent upon closure of said second circuit, operation of said heating means for a drying operation depending upon closure of said first closed circuit, and operation of said timer during said wash and rinse periods requiring closure of said second circuit.

12. In a combination washer-dryer including a wash basket within an enclosing tub, water fill means for washing, heating means for drying, an electrical sequence control including a wash switch closed during the washing cycle and a dry switch closed during the drying cycle, an electrical drive for said sequence control including a wash switch closed during the washing cycle and a dry switch closed during the drying cycle, an electrical drive for said sequence control, a water level control closing a first circuit when the machine is substantially empty and opening the circuit when the machine is filled to an operating level, and a second circuit closed when the machine is filled to an operating level and opened when the water level is lowered, said wash switch being in said first circuit to energize said water fill means, said dry switch being in said first circuit to energize said heating means, and said sequence control drive during said washing cycle being in said second circuit.

13. In a combination washer-dryer, electrically operated water fill means for washing, electrically operated heaters for heating wash water and for drying, a sequence control for controlling the machine through a desired sequence of operations, a timer motor for driving said sequence control, a water level sensing device including a two position switch, a first circuit completed through said switch in one position thereof when the machine is substantially empty enabling operation of said fill means and of said heaters for drying, and a second circuit completed through said switch in its opposite position when the machine is filled to operating level enabling operation of said heaters for heating wash water and of said timer motor.

14. In a control system for a combination washer-dryer, a drive motor, a wash basket, a transmission from said drive motor to said wash basket, a switch sensitive to water level, electrical heating means, a transmission switch being normally closed and opened by a transmission failure, a centrifugal switch in the motor operated to its closed position when the motor is operating at normal speed, a manual water heater switch, and electric control means for said heating means in series with said manual water heating switch, said transmission switch, said water level switch, and said centrifugal switch during the washing operation, said electrical heating control means being effective to operate said heating means when energized whereby operation of said heating means for water heating requires closure of said switches.

15. In a control system for a combination washer-dryer, a drive motor, a wash basket, a transmission from said drive motor to said wash basket, a switch sensitive to water level, electrical heating means positioned to heat water in said basket, a transmission switch being normally closed and opened by a transmission failure, a manual water heater switch, and electrical control means for said heating means in series with said manual water heating switch, said transmission switch, and said water level switch during the washing operation, said electrical heating control means being effective to operate said heating means when energized whereby operation of said heating means for water heating requires closure of said switches.

16. In a control system for a combination washer-dryer, a drive motor, a wash basket, a transmission from said drive motor to said a wash basket, electrical heating means positioned to heat water in said basket, a transmission switch being normally closed and opened by a transmission failure, a manual water heater switch for operating said electrical heating means, and electrical control means for said heating means in series with said manual water heater switch and said transmission switch during the washing operation, said electrical heating control means being effective to operate said heating means when energized whereby operation of said heating means for water heating requires closure of said switches.

17. In a control system for a combination washer-dryer including a wash basket, a drive motor, a drive belt in the connection from said motor to the wash basket, a switch sensitive to water level, electrical heating means positioned to heat water in said basket, a belt switch having a normally closed position until opened upon a belt failure, a centrifugal switch in said drive motor having a normally closed position when the motor is operating at normal speed, a manual control switch for said electrical heating means, a sequence control including a plurality of switches and a control switch for said electrical heating means, and electrical control means for said heating means in series with said manual water heater control switch, said belt switch, said water level switch, said centrifugal switch, and said sequence control switch during a washing operation, said electrical heating control means being effective to operate said heating means when energized whereby operation of said heating means for water heating requires closure of said switches.

18. In a control system for a combination washer-dryer machine, a drive motor, a switch sensitive to water level within the machine, electrical heating means positioned to heat water in said basket, a centrifugal switch in the motor operated to a closed position when the motor is operating at normal speed, a manual water heater switch, and electrical control means for said heating means in series with said water heater switch, said water level switch, and said centrifugal switch during a washing operation, said electrical heating control means being effective to operate said heating means when energized whereby operation of said heating means for water heating requires closure of said switches.

19. In a control system for a combination washer-dryer machine, a drive motor, a switch sensitive to water level within the machine, electrical heating means positioned to heat the water used during the washing operation of said machine, a manual switch for control of said electrical heating means, a centrifugal switch in said motor, and a line switch for control of the operation of said motor, and electrical control means for said heating means in series with said manual water heater control switch, said water level switch, and said centrifugal switch during the washing operation, said electrical heating control means being effective to operate said heating means when energized whereby operation of said heating means for water heating requires closure of said switches.

20. In a clothes dryer, a basic heater section, an auxiliary heater section, parallel electrical circuits for said heater sections, a first normally closed switch for control of said auxiliary heater section, a second switch having a normally closed position for control of said basic heater section, a sequence control including a timing motor, said second switch having a normally open position in circuit with said timing motor, common thermo-responsive means for opening said first switch at a pre-selected temperature and for actuating said second switch from its closed position in said basic heater circuit to a closed position in the circuit with said timer motor, thereby to energize said timing motor to operate said sequence control to terminate the dryer operation.

21. In a clothes dryer, a basic heater section, an auxiliary heater section, parallel electrical circuits for said heater sections, a first normally closed switch for control of said auxiliary heater section, a second switch having a normally closed position for control of said basic heater section, a sequence control including a timing motor, said second switch having a normally open position in circuit with said timing motor, common thermo-responsive means for opening said first switch at a pre-selected temperature and for actuating said second switch from its closed position in said basic heater circuit to a closed position in the circuit with said timer motor, thereby to energize said timer motor to operate said sequence control to terminate the dryer operation, and adjustment means for varying the relation of said thermo-responsive means with respect to said switches for selection of the temperature of operation of said first switch.

22. In a clothes dryer, a basic heater section, an auxiliary heater section, said heater sections being arranged for energization in parallel circuit branches, thermostatic switch means responsive to the temperature within said dryer, a sequence control including a timer motor and switch means operated by said timer motor, and control means including said thermostatic switch means and the timer operated switch means for initially energizing both of said heater sections at the start of the drying operation and concurrently de-energizing said timer motor, said control means subsequently de-energizing said auxiliary heating section when the temperature within said dryer reaches a pre-selected level, thereby to complete the drying of the clothes with the basic heater section only, and when the dryer temperature indicates the clothes are fully dried energizing said timer motor to operate said sequence control to terminate the dryer operation.

References Cited in the file of this patent
UNITED STATES PATENTS

| | | |
|---|---|---|
| 2,137,928 | Tanqueray | Nov. 22, 1938 |
| 2,150,638 | Scott | Mar. 14, 1939 |
| 2,161,604 | Watts | June 6, 1939 |
| 2,173,564 | Osuch | Sept. 19, 1939 |
| 2,432,272 | Bariffi | Dec. 9, 1947 |
| 2,505,041 | Gorsuch | Apr. 25, 1950 |
| 2,621,423 | Clark | Dec. 16, 1952 |
| 2,644,245 | Hammell et al. | July 7, 1953 |
| 2,654,239 | Welch et al. | Oct. 6, 1953 |
| 2,656,695 | Miller | Oct. 27, 1953 |

UNITED STATES PATENT OFFICE
CERTIFICATE OF CORRECTION

Patent No. 2,892,334                                 June 30, 1959

Walter E. Gray, Jr.

It is hereby certified that error appears in the printed specification of the above numbered patent requiring correction and that the said Letters Patent should read as corrected below.

Column 18, lines 3 to 5, strike out "including a wash switch closed during the washing cycle and a dry switch closed during the drying cycle, an electrical drive for said sequence control --.

Signed and sealed this 1st day of December 1959.

(SEAL)
Attest:
KARL H. AXLINE
Attesting Officer

ROBERT C. WATSON
Commissioner of Patents